(12) United States Patent
Gatlin et al.

(10) Patent No.: US 8,916,791 B2
(45) Date of Patent: Dec. 23, 2014

(54) RING GEAR BASED WELDING SYSTEM

(75) Inventors: Robert Wayne Gatlin, Orange, TX (US); Charles Stewart, Orange, TX (US); Ian Sykes, Houston, TX (US)

(73) Assignee: Technip USA, Inc., Carlyss, LA (US)

( * ) Notice: Subject to any disclaimer, the term of this patent is extended or adjusted under 35 U.S.C. 154(b) by 449 days.

(21) Appl. No.: 12/698,815

(22) Filed: Feb. 2, 2010

(65) Prior Publication Data

US 2011/0186615 A1    Aug. 4, 2011

(51) Int. Cl.
*B23K 9/028* (2006.01)
*B23K 9/12* (2006.01)

(52) U.S. Cl.
CPC .............. *B23K 9/0286* (2013.01); *B23K 9/121* (2013.01)
USPC ........................ 219/60 A; 219/59.1; 219/60 R

(58) Field of Classification Search
USPC ............... 219/60 A, 60 R, 61.1, 59.1, 124.31, 219/124.32
See application file for complete search history.

(56) References Cited

U.S. PATENT DOCUMENTS

| | | | | |
|---|---|---|---|---|
| 3,102,187 | A | * | 8/1963 | Coscia ......................... 219/60 A |
| 3,972,432 | A | * | 8/1976 | Mori et al. ..................... 414/433 |
| 4,145,593 | A | * | 3/1979 | Merrick et al. ............. 219/60 A |
| 4,177,913 | A | | 12/1979 | Iwamoto et al. |
| 4,328,416 | A | | 5/1982 | Dudley et al. |
| 4,373,125 | A | * | 2/1983 | Kazlauskas ................. 219/60 A |
| 5,146,064 | A | | 9/1992 | Poirier |
| 5,347,101 | A | * | 9/1994 | Brennan et al. .......... 219/124.34 |
| 5,796,068 | A | | 8/1998 | Jones |
| 5,910,258 | A | * | 6/1999 | Kazirskis et al. ........... 219/60 R |
| 6,430,472 | B1 | | 8/2002 | Boillot et al. |
| 6,737,601 | B1 | | 5/2004 | Kramer et al. |
| 2002/0046999 | A1 | * | 4/2002 | Veikkolainen et al. .. 219/124.34 |
| 2006/0021220 | A1 | * | 2/2006 | Sato et al. ................... 29/889.21 |
| 2007/0040911 | A1 | * | 2/2007 | Riley ............................. 348/148 |
| 2011/0049105 | A1 | * | 3/2011 | Dupont et al. ............... 219/59.1 |

FOREIGN PATENT DOCUMENTS

WO    2007/110514    4/2007

OTHER PUBLICATIONS

Patent Cooperation Treaty—International Search Report and Written Opinion. PCT/US2011/022968, Apr. 6, 2011, pp. 1-12, USA. International Filing Date—Jan. 28, 2011. Priority Date Feb. 2, 2010. Applicant's Name—Global Industries Offshore, L.L.C.

\* cited by examiner

*Primary Examiner* — Henry Yuen
*Assistant Examiner* — Ayub Maye
(74) *Attorney, Agent, or Firm* — Jones Walker, LLP

(57) ABSTRACT

A welding system having a traveling base carriage, a carriage positioning mechanism engaging the base carriage; and a ring gear assembly mounted on the base carriage. The ring gear assembly will include: (i) two half ring sections, each having at least one gear track; (ii) a ring gear mount attaching each of the half ring sections to the base carriage, where the ring gear mounts allow the half ring sections to separate and guide the half ring sections into mating engagement. The system further includes at least one weld head assembly mounted on the ring gear assembly. The weld head assembly includes: i) a welding torch; ii) a torch positioner, and iii) a position sensor. A system controller is programmed to control at least the carriage positioning mechanism and the weld head assembly in order to perform the steps of: (i) setting a velocity of the base carriage to approximate the pipe joint's lateral movement in order to maintain the position of the weld head assembly approximately at the pipe joint; and (ii) adjusting a path of the welding torch to accommodate a geometry of the pipe joint as detected by the position sensor.

28 Claims, 13 Drawing Sheets

US 8,916,791 B2

RING GEAR BASED WELDING SYSTEM

I. FIELD OF INVENTION

The present invention relates, in general, to the welding of pipe joints and, in particular, to automated methods for welding pipe joints.

II. BACKGROUND OF INVENTION

When laying a pipeline at sea it is customary to weld, on a lay-barge, individual pipe sections into a pipe string (with the pipe string leading towards the seabed). The pipe-string is under great tension while being laid and weld joints must be sufficiently strong to withstand the high forces imposed on the weld joints. Each time a pipe is welded to another pipe, extensive tests are made to ensure that the quality of the weld joint formed is sufficient. The strength of a weld joint depends upon various factors, one being the geometry of the path traced by the point of contact of the arc in relation to the surfaces of the pipes to be joined. If the point of contact of the arc is not closely controlled, the quality of the weld may be insufficient.

One conventional method of welding two pipes together involves beveling the ends of the pipes such that when the pipes are arranged coaxially with respect to each other immediately before the welding process commences, an exterior circumferential groove is defined between the two pipes. A carriage is mounted on one of the pipes for movement around the circumference of the pipes to be joined, e.g., a conventional "bug & band" system. A welding torch is mounted on the carriage and the apparatus is so arranged that the end of the metal electrode of the torch is opposite and relatively close to the circumferential groove. The carriage is moved around the circumference of the pipe and the torch is operated so that an arc is directed into the groove. The arc is guided manually and/or by various mechanical sensors to guide the arc as accurately as possible along the length of the groove. The welding process generally takes several passes and often the passes are performed by a series of sequentially positioned welding stations on a lay-barge.

In pipe laying, the welding process is highly repetitive requiring the welding of hundreds of pipe joints per day with multiple passes on each pipe joint. Therefore, even small increases in the speed of the individual welding cycle for each pipe joint can result in significant operational savings.

III. BRIEF DESCRIPTION OF THE DRAWINGS

IV. DETAIL DESCRIPTION OF SELECTED EMBODIMENTS

Figure 1:
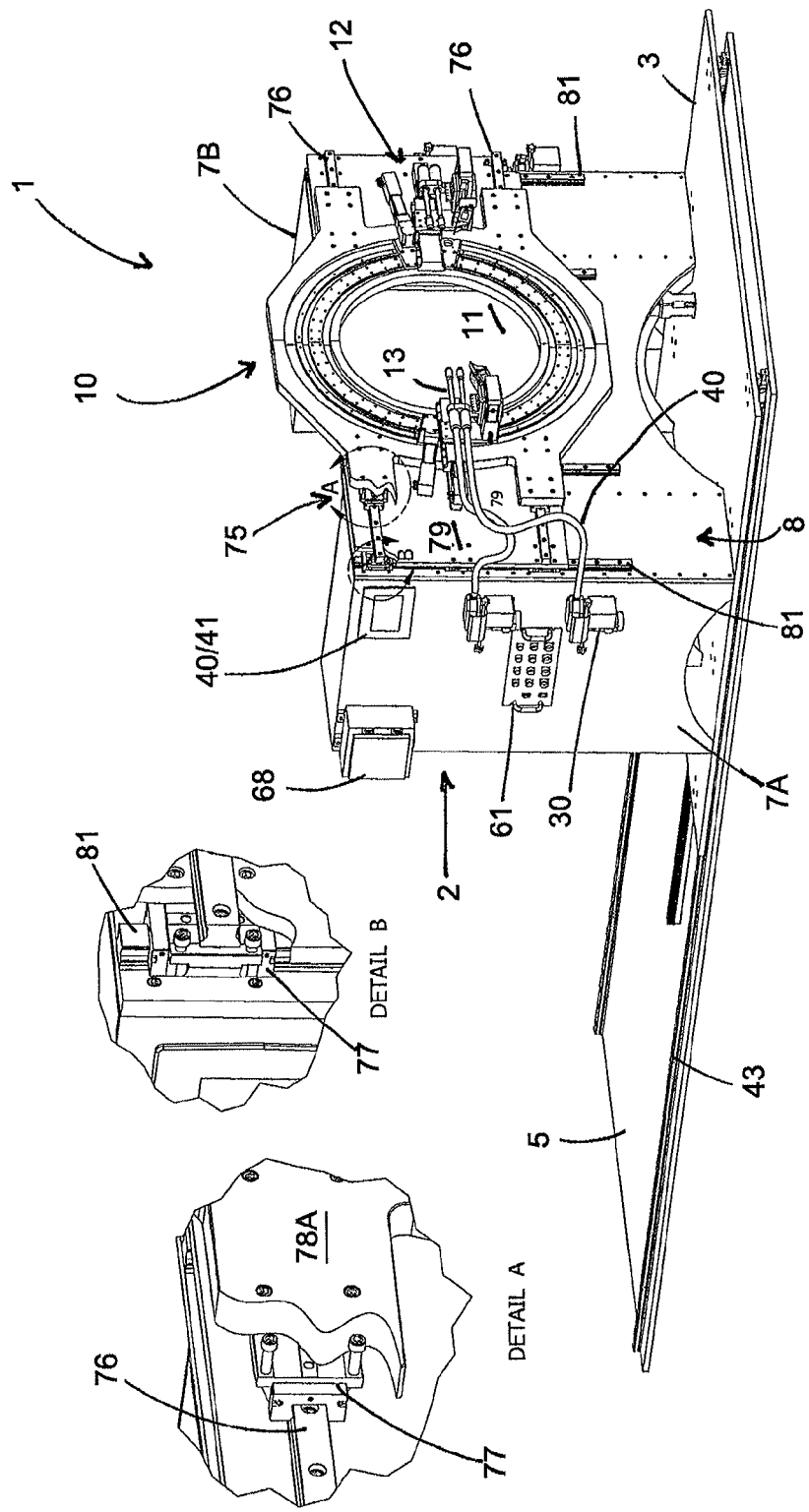
FIG. 1 is an isometric view of one embodiment of the automated welding system of the present invention.
Figure 2:
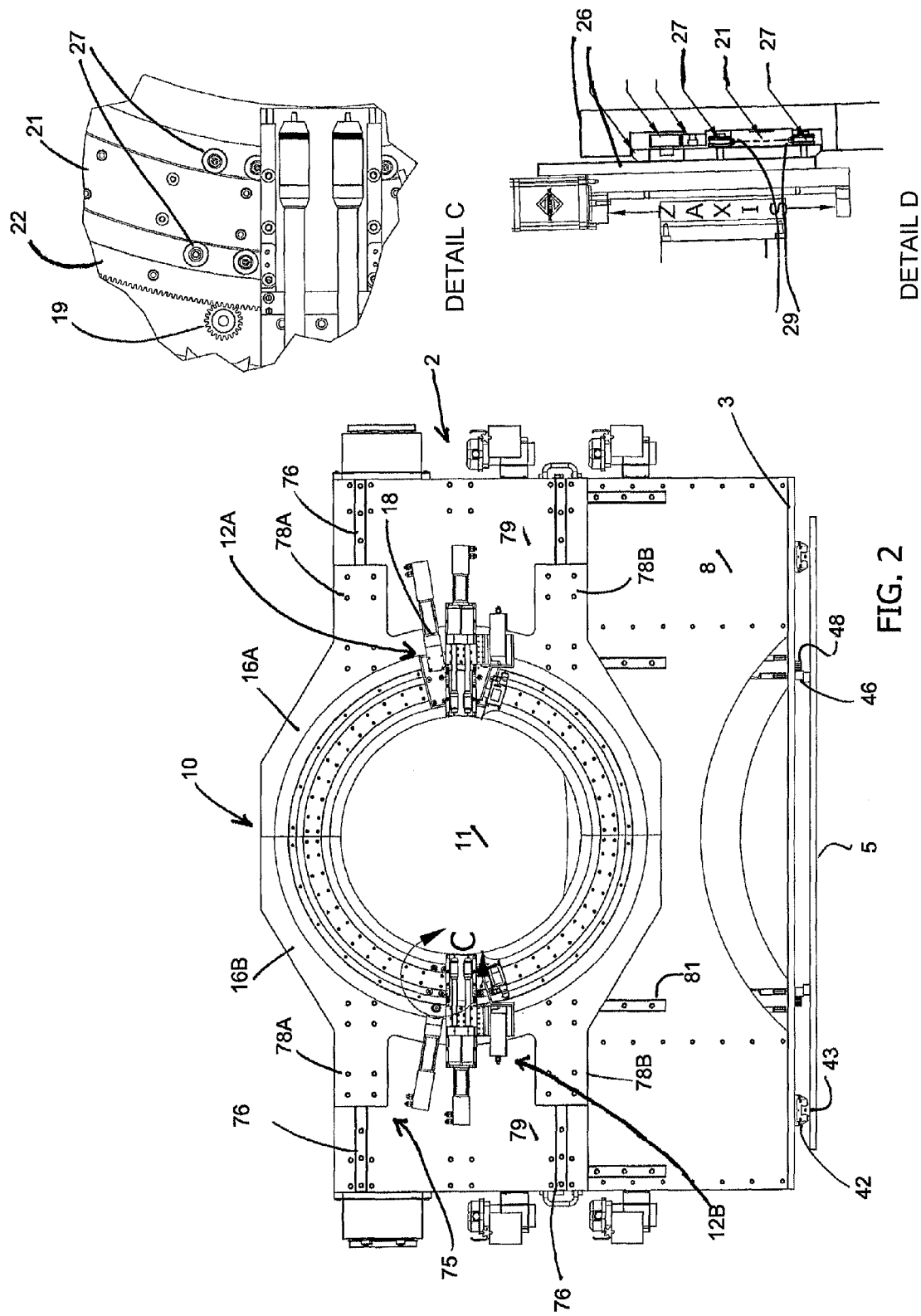
FIG. 2 is a front view of the welding system seen in FIG. 1.

FIG. 1 illustrates one embodiment of automated welding system 1. This embodiment generally comprises a traveling base carriage 2, a ring gear assembly 10, and one or more weld head assemblies 12 mounted on ring gear assembly 10. In FIG. 1, the principle components of traveling base carriage 2 consist generally of two side compartments 7A and 7B and front plate 8 fixed onto traveling platform 3. Typically, a floor plate 5 is positioned on a surface of a welding area or welding station. In one embodiment, this surface is the deck of a pipe laying barge or other maritime vessel. However, floor plate 5 could also be positioned at any land-based location. When floor plate 5 is positioned on a pipe laying barge, floor plate 5 will normally be located at a designated "weld station" or location on the barge where the pipe is intended to be welded. Often there will be multiple weld stations on a barge and a welding system 1 could be positioned at each weld station. As seen in FIGS. 1 and 2, traveling platform 3 is able to move along floor plate 5 via rail carriage 42 riding on guide rails 43. As suggested by the end view of FIG. 2, the cross-section of this example of guide rail 43 takes on a conventional dove-tail shape to ensure secure engagement with rail carriage 42.

Figure 6:
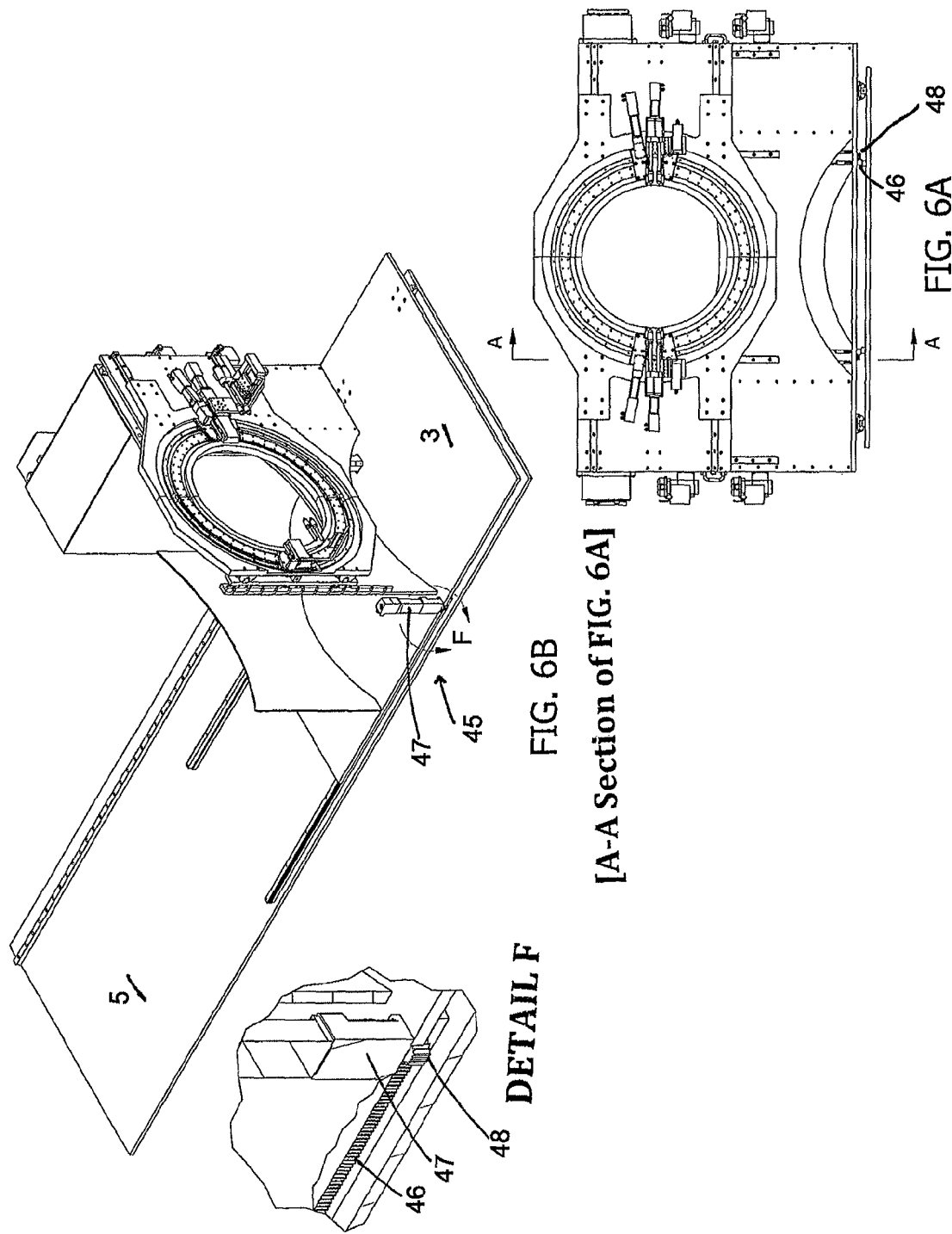
FIG. 6 illustrates one embodiment of the carriage positioning mechanism.

Many embodiments of the welding system will include a carriage positioning mechanism, one example of which is seen in FIG. 6B. Carriage positioning mechanism 45 imparts lateral movement (i.e., movement back and forth along directional arrow 52 in FIG. 6B) between the fixed floor plate 5 and traveling platform 3. In the embodiment shown in Detail F of FIG. 6B, the carriage positioning mechanism 45 consists of splined track 46 being engaged by gear 48, which is in turn powered by motor 47. Although FIG. 6B shows only one motor 47, it will be understood a second one is hidden from view and corresponds with the second gear 48 seen in the Figures. Viewing FIG. 2, it will be apparent how traveling platform 3 is able to ride on the two guide rails 43 with the engagement of gear 48 and splined track 46 providing the motive force necessary for controllably positioning traveling base carriage 2, and thus ring gear assembly 10, at any lateral position along floor plate 5.

Figure 3:
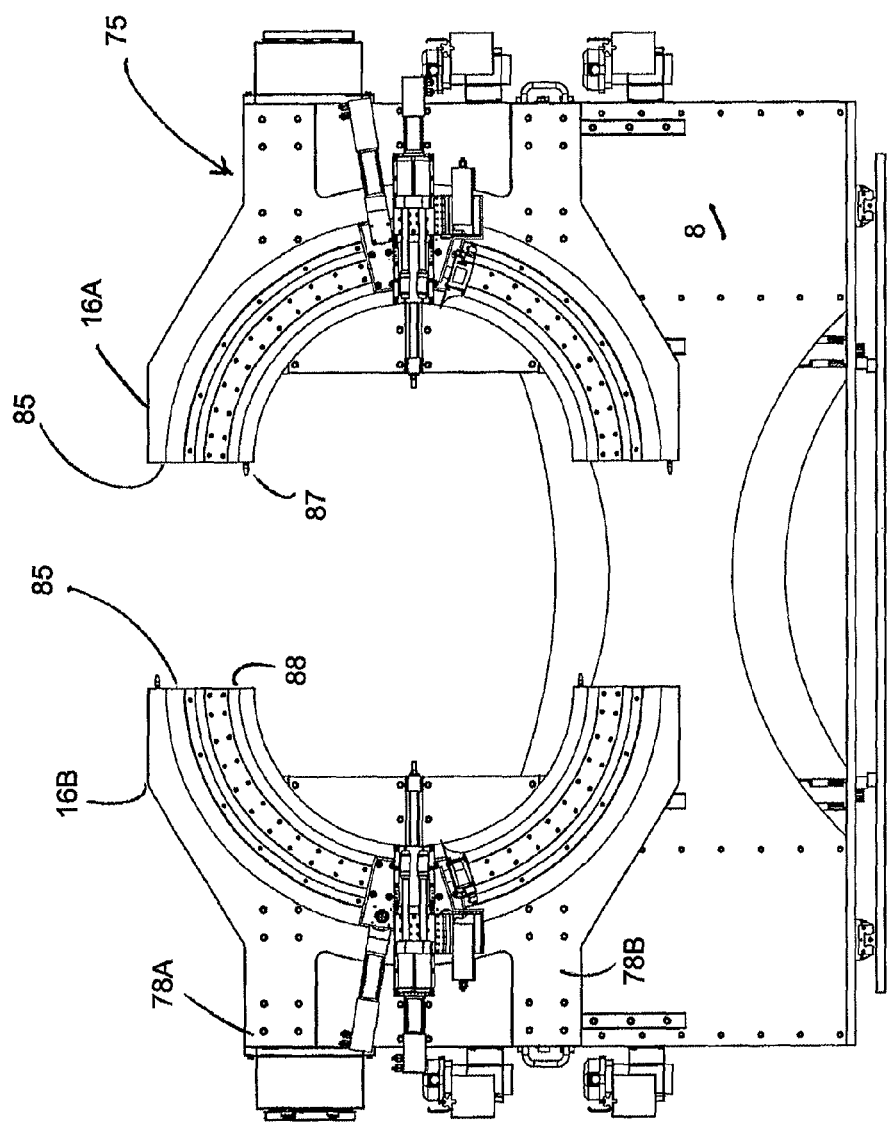
FIG. 3 illustrates a ring gear assembly in the separated position.

As seen in FIGS. 2 and 3, this embodiment of ring gear assembly 10 is formed by two half ring sections 16A and 16B and ring gear mounting assemblies 75 for connecting the half ring sections 16 to front plate 8 of base carriage 3. As part of this embodiment of mounting assemblies 75, each of half ring sections 16A and 16B include upper extension arm 78A and lower extension arm 78B. The extension arms 78A and 78B will engage horizontal guide rails 76 which are in turn fixed to mounting plates 79. As suggested in detail A of FIG. 1, a rail carriage 77 is bolted onto each extension arm 78 such that rail carriages 77 may slidingly engaging tracks 76, thereby allowing half ring sections 16A and 16B to move between the open and closed positions seen in FIGS. 3 and 2, respectively. In this embodiment, guide rails 76 and rail carriages 77 will have a mating dove tail configuration similar to guide rails 43 and rail carriages 42 described above. This embodiment of ring gear mounting assemblies 75 further provides a means for adjusting the vertical height of ring gear assembly 10 through the sliding connection of mounting plates 79 to front plate 8 via vertical guide rails 81. As suggested in detail B of FIG. 1, vertical guide rails 81 (which are oriented substantially perpendicular to guide rails 76) will be engaged by the rail carriages 77 bolted to mounting plats 79. In many embodiments, a pin, catch, or other locking mechanism will engage the guide rails and rail carriages to prevent relative movement between these elements once they are in the desired position, e.g., ring gear assembly 10 is set at the desired height on vertical guide rails 81.

FIGS. 2 and 3 illustrate how half ring sections 16A and 16B will move between an open and closed position. While the embodiment of FIG. 2 shows the "closed position" with half ring sections 16A and 16B in actual contact, this may not be necessary for all embodiments of the invention. For example, a "closed position" with a some gap between the half ring sections is possible if the travel of weld head assemblies 12 is limited to their respective half ring sections. However, in more typical embodiments, the closed position will bring the half ring sections into mating engagement. The illustrated half ring sections 16 generally include mating surfaces 85 where the two half ring sections engage one another. In FIG. 3, the mating surface will include guide members formed of pin extensions 87 which engage apertures 88 (see Detail E of FIG. 5). However, those skilled in the art will recognize many other techniques for guiding the half ring sections 12 into a well aligned engagement. "Mating engagement" is not limited to any particular structure and mating engagement simply means the two half ring sections come together within sufficient tolerance to allow the weld head assemblies to transverse the connection point of the two half ring sections. Although not specifically illustrated, many embodiments will include a latch or other mechanism which locks half ring sections 16A and 16B when in the closed position and is releasable to allow the half ring sections to move into the open position.

Although the embodiment seen in the figures contemplates manual positioning of the half ring sections 16A and 16B, on guide rails 76, other embodiments could automate this positioning function using worm gears, piston and cylinder assemblies, or other conventional or future developed positioning mechanisms. Likewise, guide rails 76 and rail carriages 77 are merely one form of mounting assembly 75 and those skilled in the art will recognize many obvious variations which are intended to come within the scope of the present invention.

Figure 4A:
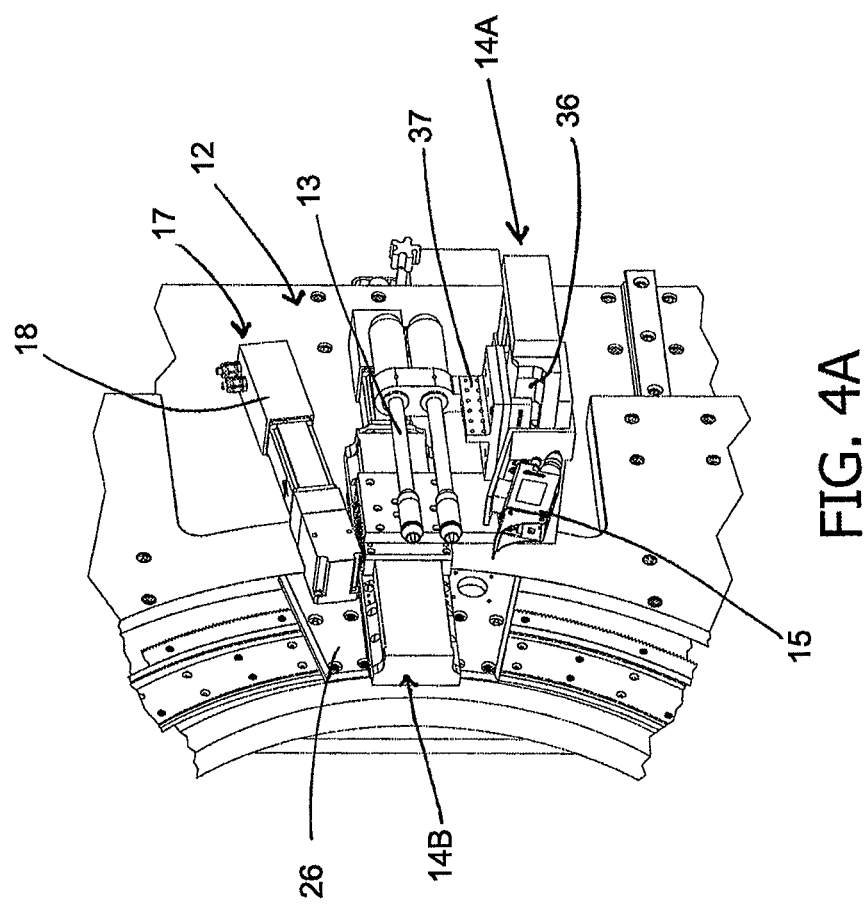
FIGS. 4A and 4B are enlarged views of one embodiment of the weld head assembly.
Figure 4:
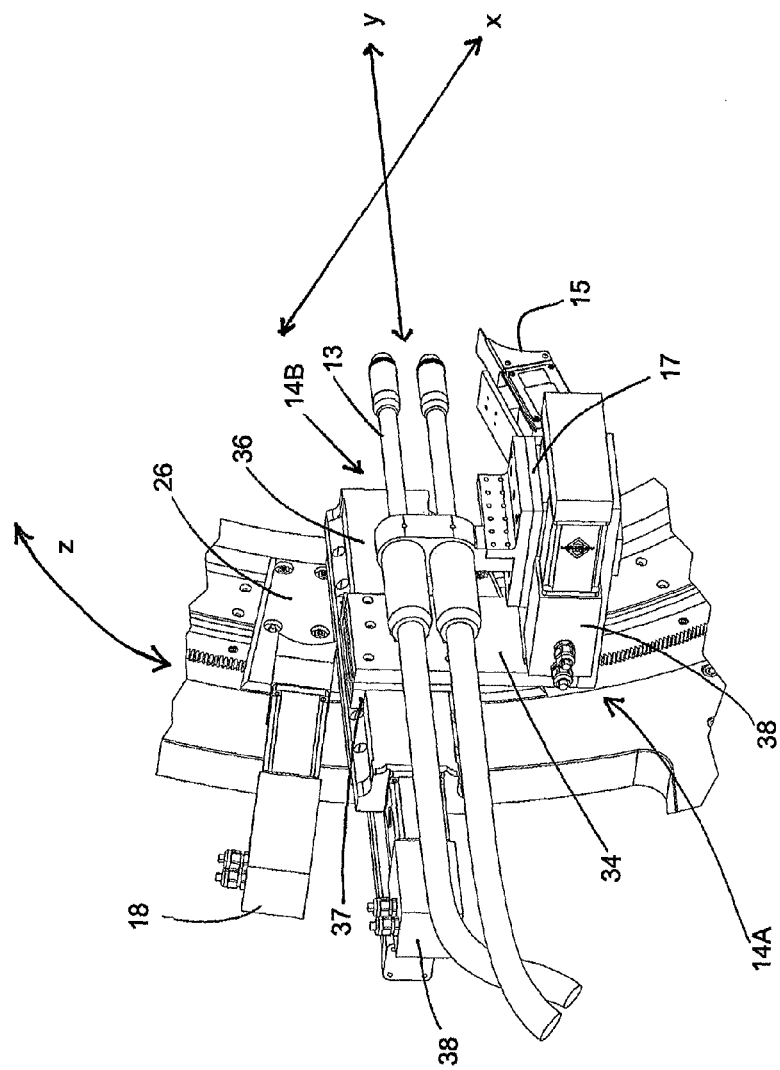

The general function of ring gear assembly 10 is to provide an orbital path for one or more weld head assemblies 12. The particular structure which the illustrated embodiments of ring gear assembly 10 employ to carry out this function is best seen in Detail E of FIG. 5. The open face of ring gear assembly 10 will include ring gear 22, guide track 21, and outer/inner shoulders 23A and 23B of ring gear assembly 10, all of which are circular structures set at different radial distances from the center of ring gear assembly 10. FIGS. 4A and 4B illustrate how the weldhead assemblies 12 will include the arcuate mounting plate 26 with a width and radius of curvature which allows mounting plate 26 to slide in an orbital path around ring gear assembly 10 between shoulders 23A and 23B. Although somewhat hidden from view in the figures, it will be understood that the reverse side of mounting plate 26 has a series of rollers engaging guide track 21. Detail C of FIG. 2 shows mounting plate 26 removed but illustrates how rollers 27 would engage guide track 21. Detail D of FIG. 2 shows a side sectional view of rollers 27 engaging guide track 21. Detail D also suggests how the bead track 29 formed on each side of guide track 21 and which is engaged by a center groove formed in rollers 27 will help maintain mounting plate 26 securely coupled to guide track 21.

It will also be apparent from the figures that mounting plate 26 forms the attachment point for the other components of weld head assembly 12 to ring gear assembly 10. A weld head assembly positioner 17, which in the illustrated embodiment is positioning motor 18, will engage mounting plate 26. Positioning motor 18 will have a shaft which extends through mounting plate 26 and drives a gear 19 (see detail C in FIG. 2) which engages ring gear 22. The splines of gear 19 will engage the cogs on ring gear 22 such that torque applied by positioning motor 18 to gear 19 will cause mounting plate 26 (and thus weld head assembly 12) to move in an orbital path along guide track 21. In one embodiment, positioning motor 18 is a model no. BM200 available from Aerotech, Inc. of Pittsburgh, Pa.

Figure 5:
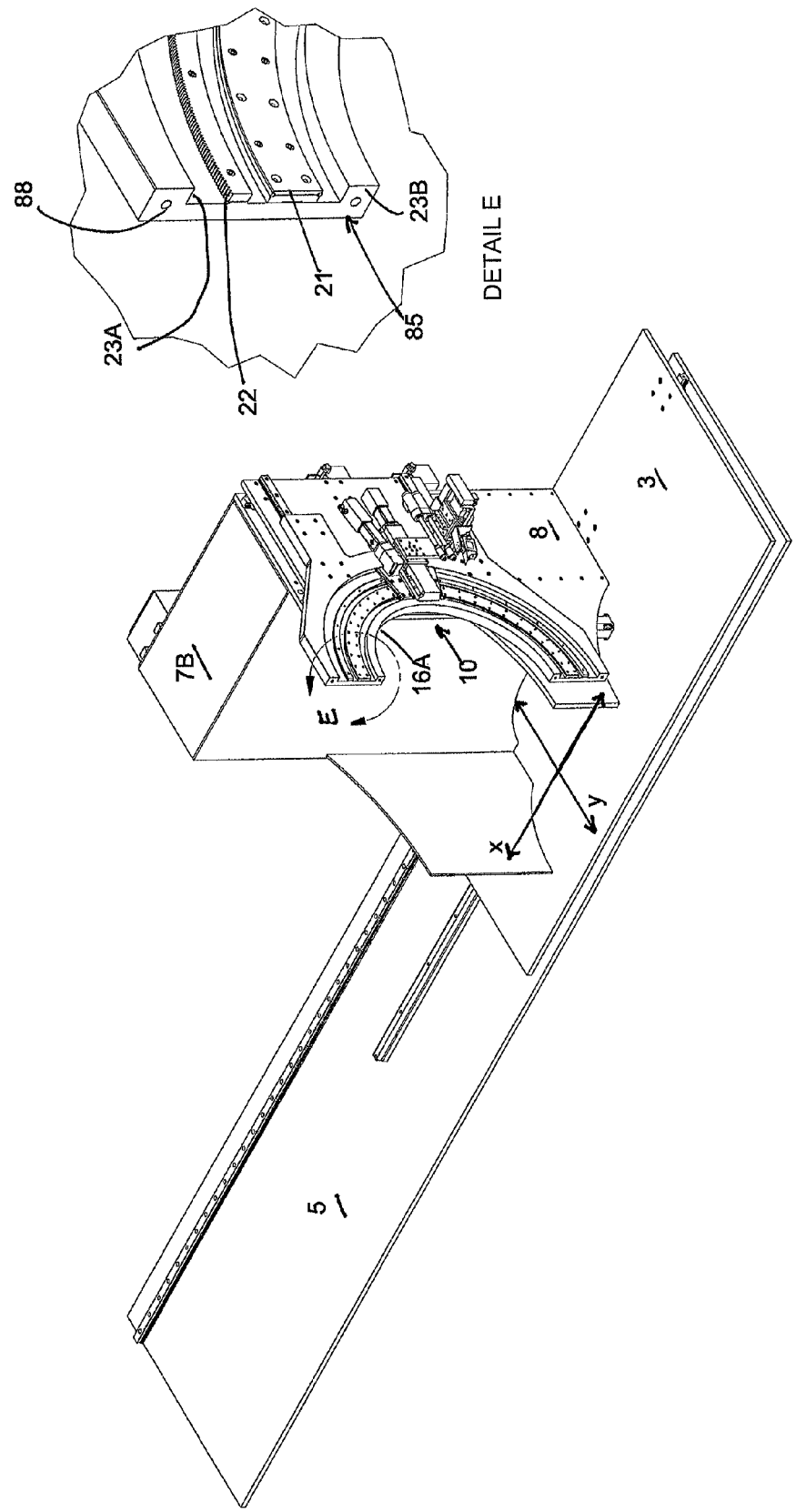
FIG. 5 illustrates a sectional view of the ring gear assembly.

Although detail E in FIG. 5 illustrates one embodiment of ring gear assembly 10's gear and guide track structure, those skilled in the art will see that many modifications are possible. For example, rather than being on the outer perimeter of guide track 21, ring gear 22 could alternatively be on the inner perimeter of guide track 21. Alternatively, there could be two rings 22, e.g., a ring gear on each side of guide track 21. As a still further alternative, a single ring gear 22 could be provided with two guide tracks 21 (e.g., a guide track on both the inner and outer perimeter of the ring gear). These and other modifications to ring gear assembly 10 should be considered within the scope of the present invention.

Returning to FIG. 4A, other components of weld head assembly 12 directly or indirectly positioned on mounting plate 26 include a welding torch 13, a two torch positioners 14A and 14B, and a torch position sensor 15. Although the particular welding torch 13 illustrated in FIG. 4A is a dual torch configuration, the use of "welding torch" in the singular will refer to any of a single torch, dual torch, or other torch configuration.

The torch positioners 14A and 14B (as best seen in FIG. 4B) include a mounting rail 36 (also sometimes referred to as a "linear stage") and a sliding bracket 37 which moves along mounting rail 36. In one embodiment, torch positioners 14A and 14B are PRO-115 series linear actuators manufactured by Aerotech, Inc. of Pittsburgh, Pa. In the illustrated embodiment, mounting rail 36 of torch positioner 14B is bolted to mounting plate 26. Although hidden from view in the figures, a worm gear within mounting rail 36 engages sliding bracket 37 and is rotated by motor 38, causing sliding bracket 37 to moved along the length of mounting rail 36. It can be seen in FIG. 4B that a side mounting bracket 34 is attached to sliding bracket 37. Attached to side mounting bracket 34 is the torch positioner 14A. Viewing FIG. 4A, torch positioner 14A also has a mounting rail 36 and a sliding bracket 37 to which torch 13 is attached. However, it can be seen that the mounting rail 36 for torch position 14A is somewhat shorter than that for torch position 14B since torch positioner 14A can function with a lesser range of movement.

With torch 13 attached to sliding bracket 37 of positioner 14A, the torch can move in the "x" direction (i.e., parallel to a pipe section being welded) defined by the co-ordinate reference seen in FIGS. 4B and 5. Likewise, positioner 14A itself is attached to the sliding bracket 37 of the positioner 14B, thereby allowing positioner 14A (and thus torch 13) to move back and forth in the "y" direction shown in FIGS. 4B and 5 (i.e., moving torch 13 radially toward and away from the pipe section). Because torch positioner 14B is fixed to mounting plate 26, it can be seen that the orbital path of mounting plate 26 (the "z" direction shown in FIG. 4B) will move torch 13 around the circumference of a pipe positioned through center opening 11 of ring gear assembly 10.

As also shown in FIG. 4A, a position sensor 15 is positioned adjacent to torch 13 on torch positioner 14A. In this embodiment, position sensor 15 is mounted directly on torch positioner 14A and therefore moves with the torch 13. However, in other embodiments, position sensor 15 could be mounted independently of either torch positioner (e.g., on any open area of mounting plate 26) and not move in either the "y" or "x" directions. In the embodiment shown, position sensor 15 is a combination laser/CCD device which can identify surface features on the pipe (e.g., the joint between two pipes which are being welded). Such laser/CCD devices are described in U.S. Pat. No. 6,430,472 which is incorporated by reference herein in its entirety. A commercial embodiment of such a sensor is the AUTO-TRAC® laser vision system provided by Servo-Robot, Inc. of St-Bruno, Canada. Position sensor 15 provides data on the position of torch 13 relative to the pipe joint being welded and allows a controller (described below) to move the torch 13, via positioners 14A and 14B, in the necessary pattern to properly weld the pipe joint. The embodiment showing in FIG. 1 mounts the AUTO-TRAC® control components 68 on side compartment 7. In alternative embodiments, the position sensor could be any suitable conventional or future developed position sensing technique, including thru-the-arc sensing which detects a change in arc voltage based on torch distance from the pipe joint, or mechanical sensing which uses a physical wand or probe in contact with the pipe joint.

Different types of torches 13 may be used with the present positioning system. Example welding technologies include gas metal arc welding (GMAW), gas tungsten arc welding (GTAW), flux cord arc welding (FCAW), or laser beam welding (LBW), but other conventional and future developed welding methods should be considered within the scope of the present invention. The number of weld head assemblies positioned on ring gear assembly 10 may vary based upon factors such as the welding technology employed and the size of the pipe being welded. For GMAW, one embodiment employs two weld head assemblies 12, while other embodiment could employ just one weld head assembly 12 or possibly 3, 4, or more weld head assemblies 12. When using LBW or plasma arc welding systems, preferred embodiments may employ a single weld head assembly (but could also employ multiple weld head assemblies).

FIG. 1 illustrates weld-head flexible supply conduits (or hoses) 40 extending between the torches 13 and wire feed assemblies 30 which are positioned on the walls of side compartments 7. Where the torch is the type using a consumable wire in the welding process (e.g., gas metal arc welding), wire is fed through hoses 40 to torches 13 by feed assemblies 30 as is known in the art. A supply of wire is typically stored on a spool or reel (not shown) and is usually drawn off the reel by a feed motor in order to feed torches 13 in a controlled manner. Hose 40 may also enclose power cables for the torch and positioner motors along with electrical control lines to the positioner motors and position sensors on weld head assemblies 12. Although not shown, the control lines will run to a controller, which in certain embodiments is a computer system positioned within side compartment 7. In this embodiment, hoses 40 are flexible and of sufficient length to accommodate a weld head assembly 12's intended orbital path around ring gear assembly 10. For example, if two weld head assemblies 12 are employed, the hoses 40 may only need to be long enough to accommodate a half-orbit path, whereas if one weld head assembly 12 is employed, the hoses may need to be long enough to accommodate a full orbit of travel by the weld head assembly.

Figure 7:
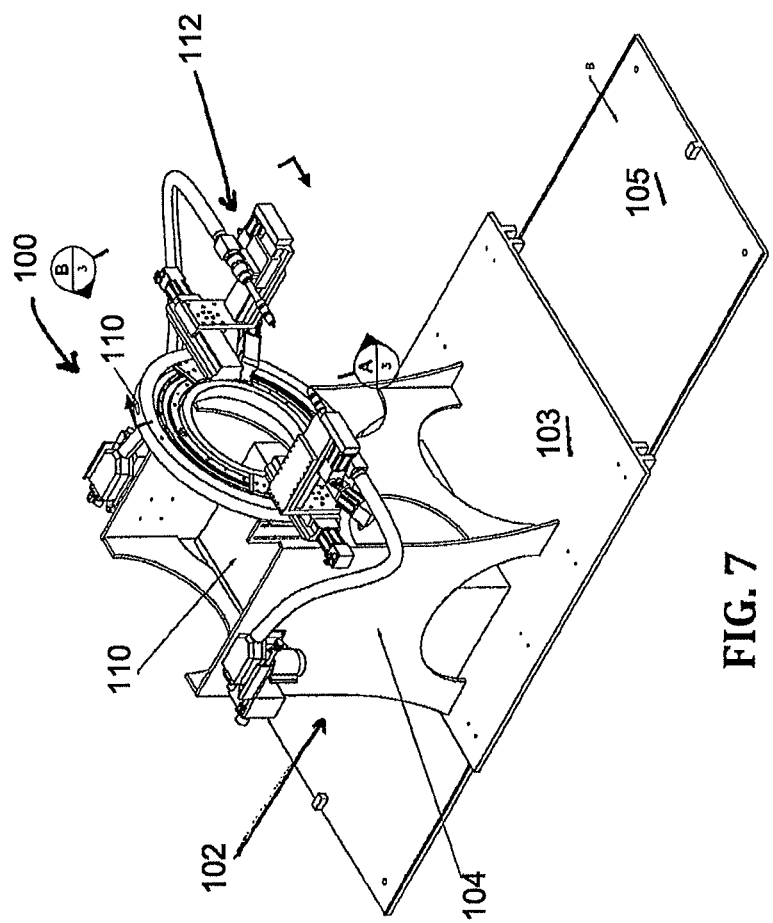
FIG. 7 is an isometric view of an alternative embodiment of the present invention.
Figure 8:
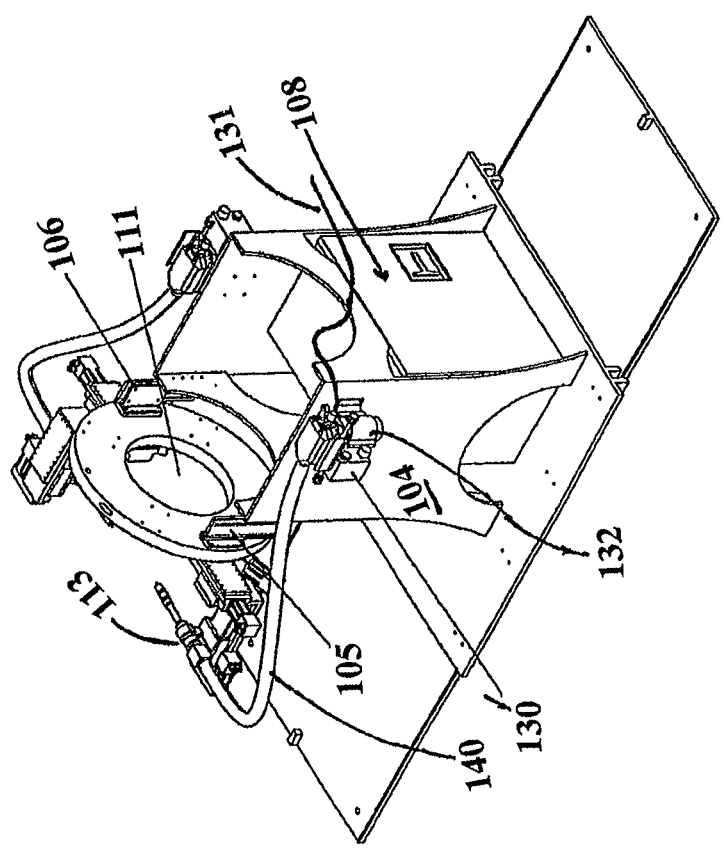
FIG. 8 is a rear view of the embodiment of FIG. 7.

FIGS. 7 and 8 illustrate an alternate embodiment of the inventive welding system. In this embodiment, welding system 100 includes a unitary ring gear assembly 110, i.e., a ring gear assembly which is a continuous ring of material (or at least multiple segments fixed together in a semi-permanent manner) as opposed to the readily separable segments as in the previous embodiment. Viewing FIG. 8, a pair of vertically adjustable ring gear assembly brackets 106 will mount ring gear assembly 110 on ring gear assembly stand 104. Ring gear assembly brackets 106 will allow the height of ring gear assembly 110's center aperture 111 to be adjusted to approximately match the height of the pipe sections being welded, as is explained in more detail below. The weld head assemblies 112 are substantially the same as weld head assemblies 12 described above. However weld head assemblies 112 are of a single torch configuration. As suggested in FIG. 7, welding system 100 will have a travel base carriage 102 mounted on a traveling platform 103 which moves on floor plate 105 in a manner similar to that described above in reference to traveling base carriage 2.

Similar to the embodiment described in FIG. 1, FIG. 8 illustrates weld-head flexible supply conduits (or hoses) 140 extending between the torches 113 and wire feed assemblies 130 which are positioned on a sidewalls of ring gear assembly stand 104. As with the earlier embodiment, hoses 140 are flexible and of sufficient length to accommodate a weld head assembly 112's intended orbital path around ring gear assembly 110.

Figure 9:
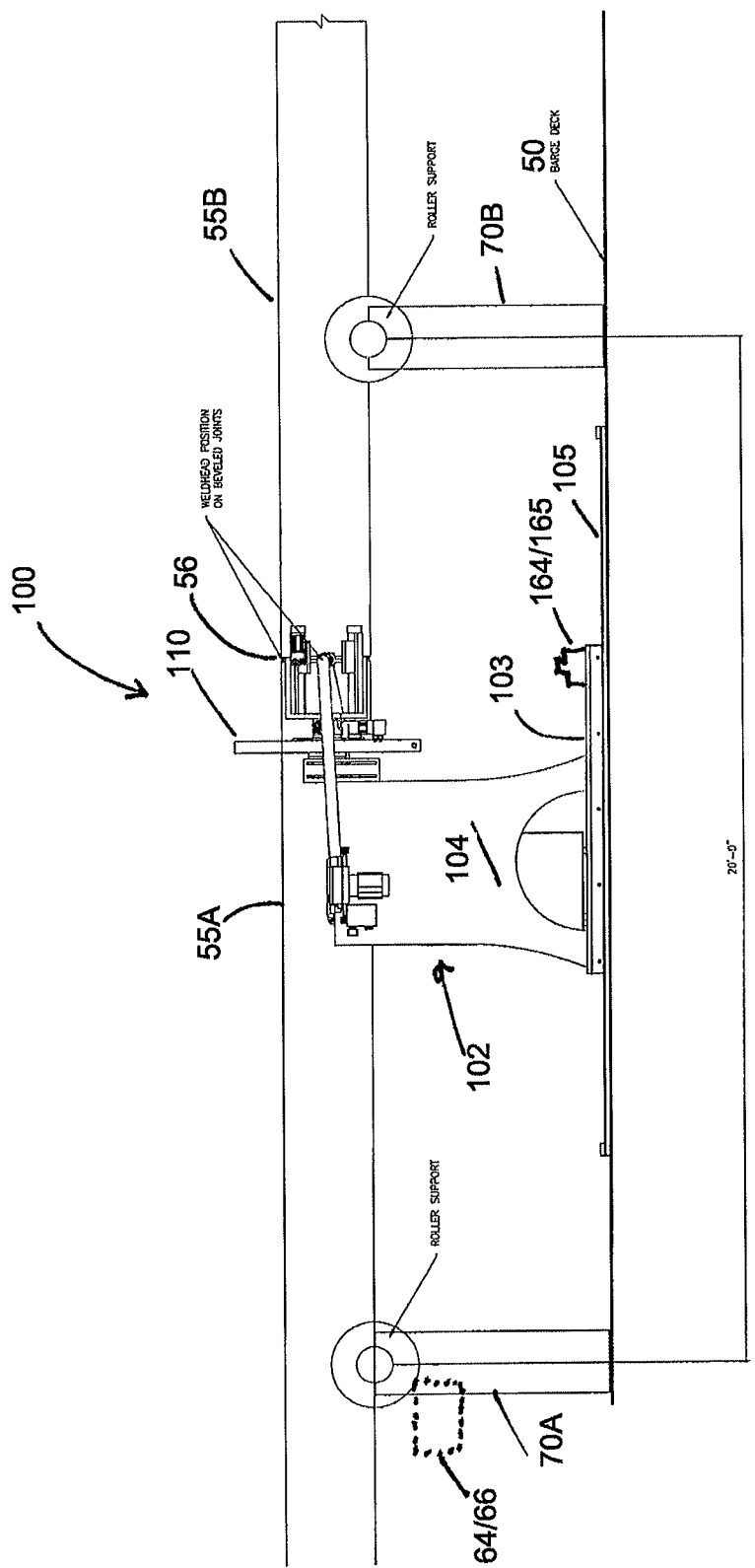
FIG. 9 illustrates the FIG. 7 embodiment welding the joint of two pipe sections.

As suggested in FIG. 9, certain embodiments of the welding system will include the floor plate 105 positioned on the deck 50 of a pipe-laying barge. Although this pipe-laying barge example is described in relation to welding system 100, it will be understood that the description is equally applicable to welding system 1. Typically the pipe-laying barge will have a series of support rollers 70 which support the individual pipe sections (before welding) and then the continuous pipeline portion (after welding). Although only two support rollers 70 are shown in FIG. 9, it will be understood that other support rollers to the right and left of those shown allow the pipe sections to lie level with the ends abutting at joint 56. In many situations, an internal clamp (not shown) will bridge the pipe joint within the two pipe sections and hold the ends of the pipe sections securely together. If the welding system is barge based, it can be envisioned that as individual pipe sections 55 (entering the welding area or weld station from the left) are welded together, a continuous pipe line of welded sections is formed and exits the weld station to the right. It will be understood that other equipment on the barge deck such as pipe tensioners (not seen in the figures) are typically holding the pipe sections in tension while letting the weight of the overboard pipeline and the barge's forward movement slowly move the pipe sections in a continuous process through one or more weld stations along the deck of the pipe laying barge. In this manner, the completed pipeline is continuously exiting the barge and being positioned on the sea-bed even as the length of the pipeline is being extended by the welding of new pipe sections to the pipeline. It will be apparent from the embodiment of FIG. 9 that the ring gear assembly 10 (and thus base carriage 2) is not connected to the pipe sections and may move independently of pipe sections. This may be distinguished from prior art "bug & band" systems where a band connects circumferentially around the pipe adjacent to the pipe joint and the weld head assembly is attached to and travels along the band. One significant disadvantage with conventional bug and band systems occurs when tensioner failure releases a pipe section allowing the pipe section to move through the weld stations at a high and uncontrolled speed. In this very dangerous situation, the bug & band structure along with the attached weld head assembly is carried with the pipe causing significant damage or injury to any equipment or personnel in the path of the bug and band structure. On the other hand, when employing the above described welding systems 1 or 100, a rapid and uncontrolled movement of the pipe sections does not drag extraneous equipment along with the pipe and is less likely to cause serious equipment damage or personnel injury.

Figure 10:
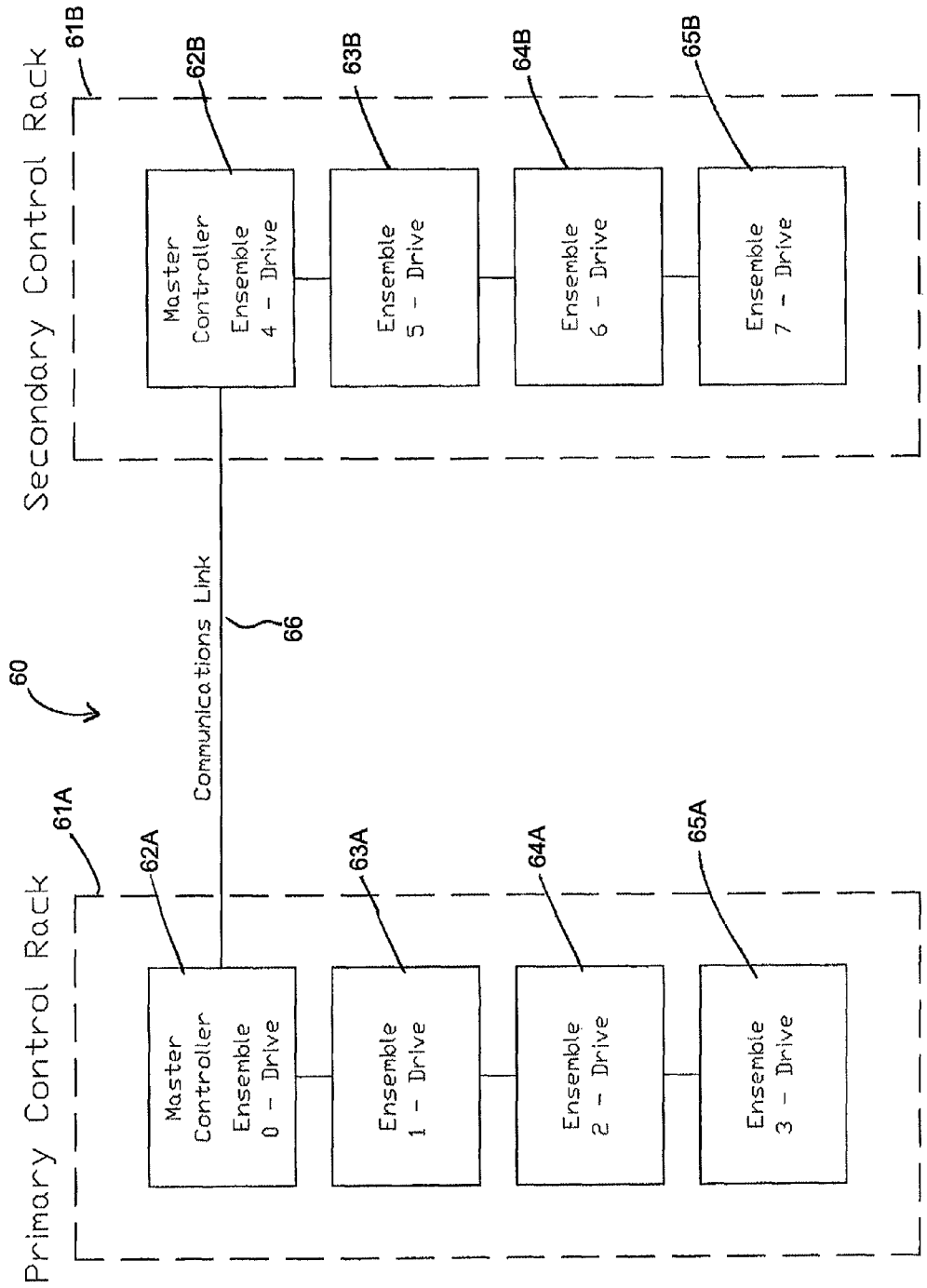
FIG. 10 is a component diagram of one control mechanism for the illustrated embodiments.

The illustrated embodiments of the welding systems 1 and 100 will include a system controller directing the operation of various components of the welding system. FIG. 10 shows schematically one embodiment of system controller 60. In this example, system controller 60 is divided into two control racks, primary control rack 61A and secondary control rack 61B, which control (among other functions) the weld head assemblies 12A and 12B, respectively. Each of the control racks 61 will further comprise a series of conventional PC based controllers 62-65, each of which will typically comprise a control card for driving one or more servo motors, input/output cards, and a microprocessor. One example of such a controller is the Ensemble CP provided by Aerotech, Inc. of Pittsburgh, Pa. In FIG. 10, controllers 62 (i.e., 62A and 62B) control the respective positioning motors 18 and the thus the orbital or "z" position (see FIG. 4B) of the weld head assemblies. Controllers 63 control the respective positioners 14A and thus the longitudinal or "y" direction movement the welding torches 13. Controllers 64 control the respective positioners 14B and thus the radial or "x" direction movement the welding torches 13. Controllers 65 control the carriage motors 47 (FIG. 6B) and thus the position of traveling base carriage 2. Each of the controllers 62 act as the master controller for their respective control racks. For certain limited functions such as determining the relative orbital positions of the two weld head assemblies, controller 62A acts as the master for controller 62B via communications link 66. As seen in the embodiment of FIG. 1, the control racks 61 may be mounted within side compartments 7.

However, system controller 60 is just one example of a suitable control system and in alternate embodiments, the system controller 60 could be devices such as programmable logic controllers or possibly even hard-wired circuitry. In addition to the components discussed above, a user interface 40 (FIG. 1) will allow users to input information and instructions to system controller 60. In the embodiment of FIG. 1, the user interface is a conventional human machine interface (HMI) 41 providing touch screen input features. One suitable HMI is a Silver Series 5121-X provided by Maple Systems, Inc. of Everett, Wash. Alternatively, user interface 40 could be another interface system such as a conventional keyboard, monitor, and mouse device.

Figure 11:
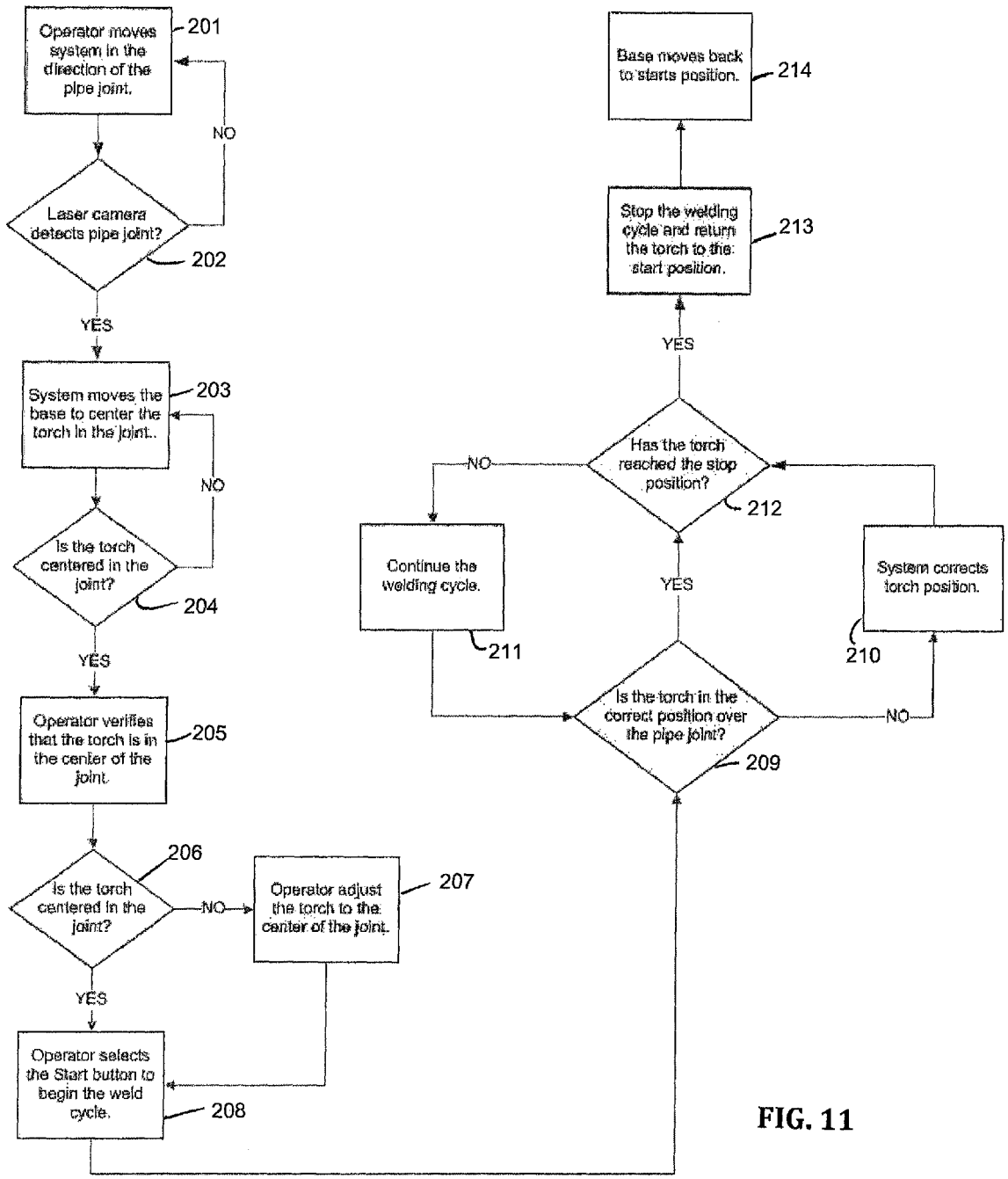
FIG. 11 is flow chart illustrating an example operational sequence of certain embodiments of the present invention.

Viewing FIG. 11 in conjunction with FIG. 9 illustrates one example of a welding cycle which could be implemented by system controller 60. In step 201, the operator initiates starting movement of the traveling base carriage 102 toward the direction of the approaching pipe joint 56. In step 202, the laser/camera components of position sensor 15 will determine when pipe joint 56 passes under the camera. In step 203, base carriage 102 changes velocity (speed and direction) as necessary to begin tracking pipe joint 56. The loop between steps 203 and 204 will allow base carriage 102 position itself such that the welding torches 13 on weld head assemblies 12 are centered over (or approximately centered over) pipe joint 56. Steps 205 to 207 allow the operator to visually confirm the centering of torches 13 over pipe joint 56 and make any necessary manual adjustments if an acceptable alignment is not visually confirmed. In step 208, the operator manually initiates the weld cycle. Steps 209 to 212 will perform a welding loop where the position of the welding torch 13 is continuously corrected (if required) as the torches proceed in their orbital path while welding the circumference of pipe joint 56. In the illustrated embodiment, the control software continuously adjusts the torch position based upon an x-y positioning feed back from the AUTO-TRAC® controller in order to maintain the welding torch at a predetermined height above the welding surface. In a preferred embodiment, the weld head assemblies 12 may also be controlled by a memory mapping mode which records the x-y coordinates from the preceding weld path and repeats this path based on the coordinates. Once the weld torch has reached its stop position (e.g., completion of its 180° circuit in a system having two weld head assemblies 12), the weld head assemblies will return to a pre-designated start position. In step 214, base carriage 102 will move back to a pre-designated start position. It will be understood that base carriage 102 is maintaining a velocity (both speed and direction) approximate to that of pipe joint 56 during the embodiment the welding steps of this process. Alternative control systems could use other feedback parameters to control the weld path. For example one alternative control system could make comparisons of welding feedback parameters (e.g., arc voltage and current, torch oscillation speed and width, and travel speed of arc) with a database of such parameters which has been empirically determined to provide optimal welds. In addition to the memory mapping mode described above, another alternative control system would be a manual controller an operator may use to adjust the x-y position of the welding torach.

Of course, FIG. 11 represent just one possible control sequence and any number of variations are within the scope of the invention. For example, the system could be completely automated with no inputs from a human operator. In one embodiment of such a completely automated system, the base carriage 102's pre-designated start position could be close to the boarder where the pipe joint 56 will enter the welding station. When the pipe joint 56 is detected passing under position sensor 15, the base carriage could begin tracking pipe joint 56 and initiate the other steps described above.

A still further alternative system could employ a separate joint sensor position within the weld station. FIG. 9 illustrates a joint sensor 164 positioned on the front of traveling platform 103. One example of joint sensor 164 would be a laser/camera distance finder 165. In another alternative, a roller sensor 66 such as an encoder which counts the turns of roller 70A and would use this information on roller turns to calculate details regarding the pipe velocity and distanced travel in a given time period.

In the embodiment where there is only one weld head assembly 12, the weld head assembly will make a full orbit around pipe joint 56 to weld the entire circumference of the joint. The most time efficient embodiment of the single weld head assembly system will make a full orbit weld in one continuous 360° trip of weld head assembly 12 (i.e., the weld head assembly does not back-track over a previous welded arc of the pipe joint). However, a full orbit weld may be accomplished by a single weld head assembly 12 welding the circumference of the pipe in broken segments. For example, the weld head assembly 12 could weld (clockwise) from the 12 o'clock position to the 6 o'clock position, cease welding and move back to the 12 o'clock position, and then begin welding again (counter-clockwise) toward the 6 o'clock position. Thus, a single weld head assembly 12 is considered to make a full orbit weld as long substantially the entire circumference of the joint is welded, regardless of how continuous or discontinuous the weld path is.

As suggested by the above description, there will be many embodiments providing two or more weld head assemblies 12 positioned on the ring gear assembly 10. In such embodiments, it may be advantageous to stagger the start times and positions of the various weld head assemblies so that they do not interfere with one another. Using the two weld head assemblies seen in FIG. 2 as an example, the first weld head assembly 12A may begin welding clock-wise from the 12 o'clock position while the weld head assembly 12B stands by at the 9 o'clock position. As weld head assembly 12A reaches the 3 o'clock position, weld head assembly 12B would move to the 12 o'clock position and begin welding in the counter-clockwise position. When weld head assembly 12A finishes its weld path at the 6 o'clock position, it will retreat to its starting position before weld head assembly 12B terminates it weld path at the 6 o'clock position. In certain embodiments, as the weld head assemblies 12 returns to their start or "home" positions, the sensor 15 on the weld head assemblies scan the weld. The scanning of the weld allows the computer system to determine the height of the weld bead in the groove of the pipe joint. The computer system can record the profile of the weld bead as detected by the camera and compare the actual weld bead profile to a database of joint geometry tolerance profiles. If the weld bead is determined to be noncompliant, the system can generate an alert signal for the operator or take other corrective action.

Figure 12:
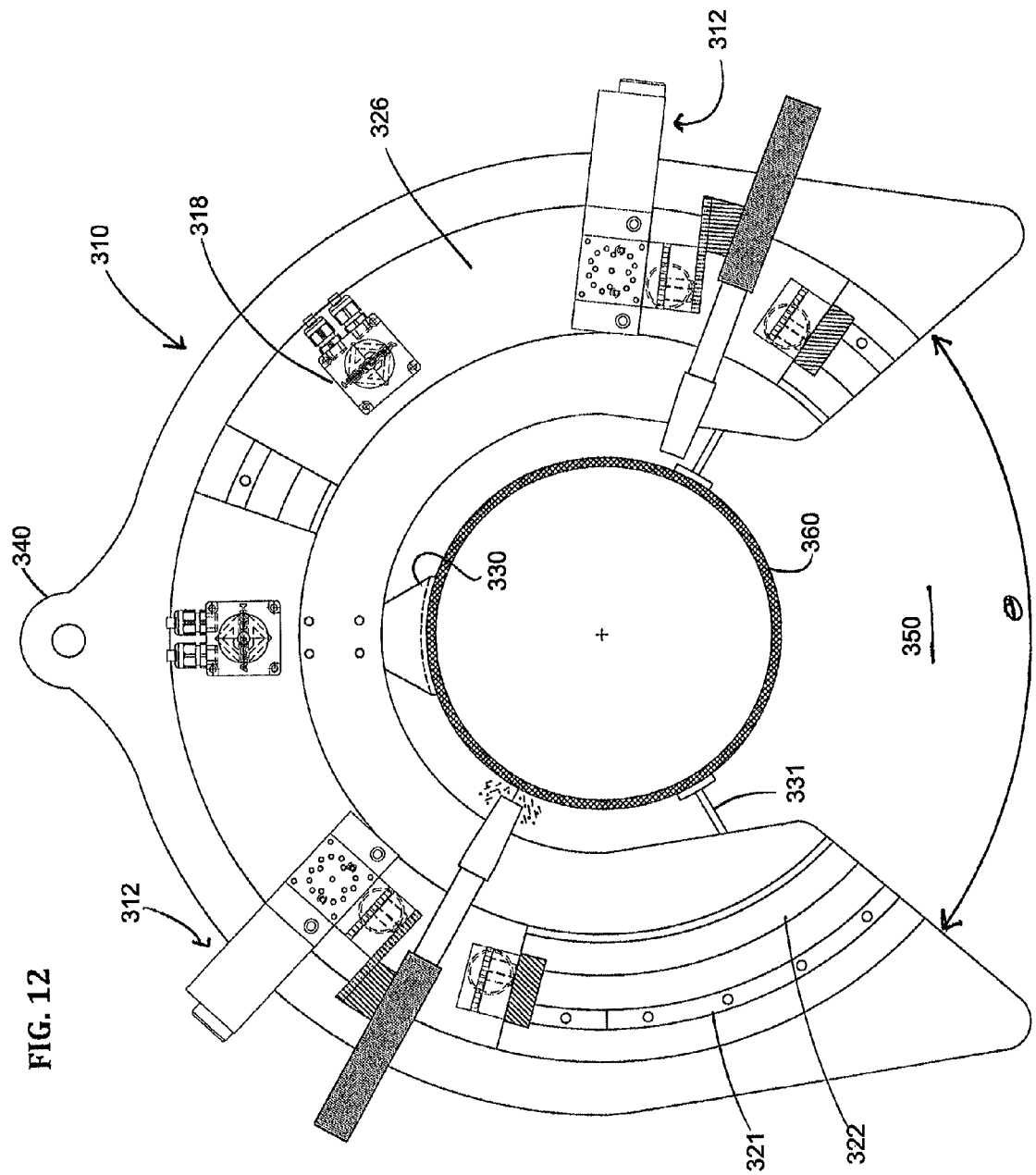
FIG. 12 illustrates a third embodiment of the ring gear assembly of the present invention.

FIG. 12 illustrates a still further embodiment of the present invention, ring gear assembly 310. This ring gear assembly includes an open throat 350 formed by a gap in the ring gear body where the gap has an arc length represented by theta in FIG. 12. In certain embodiments, theta is between about 60° and about 120° degrees and in one preferred embodiment, is about 80° degrees. Typically throat 350 will be somewhat wider than the largest diameter pipe expected to be welded by ring gear assembly 310, preferably with approximately one half inch clearance on each side of throat 350.

Ring gear assembly 310 has one or more weld head assemblies 312 which will include a welding torch, a torch positioner, and a position sensor such as described in the previous embodiments. However, mounting plate 326 differs somewhat from previous embodiments in that mounting plate 326 has a greater arcuate length and in the illustrated embodiment, will have sufficient length to position the welding torch across at least half of open throat 350 when weld head assembly 312 is in its lower most (i.e., closest to throat 350) position. It can be visualized that this allows the weld head assemblies 312 to extend into the open area of throat 350 and weld the underside of pipe section 360. Naturally, positioning motors 318 must be located at a distance sufficiently far from weld head assemblies 312 such that the weld head assemblies may extend into throat 350 while positioning motors 318 remain engaged with guide track 321 and ring gear 322. The embodiment of FIG. 12 shows two ring gear assemblies 310 where the mounting plates 326 have sufficient length to allow the weld head assemblies 312 to extend about half way across the throat gap.

Another feature of ring gear assembly 310 is the saddle brace 330 which forms a bracing and guide mechanism for the pipe section 360 onto which ring gear assembly 310 is positioned. FIG. 12 also shows two securing clamps 331 which, together with saddle brace 330, secure pipe section 360 within ring gear assembly 310. In the embodiment shown, securing clamps 331 are hydraulic (or pneumatic) ram and cylinder assemblies (only the rams are visible in FIG. 12 with the cylinder assemblies hidden behind the body of the ring gear assembly). However, the securing clamps are not limited ram and cylinder assemblies and could be any other linear actuator device (e.g., power screws) or some type of non-linear (e.g., pivoting) clamping mechanism. In the example of FIG. 12, saddle brace 330 has a face section for engaging pipe section 330 which is generally curved to correspond to the expected pipe curvature and has an arc length of between about 20° and about 60° and more preferably about 40° for engaging a pipe section.

In certain embodiments, the ring gear assembly 310 may be mounted on a traveling base carriage such as seen in FIGS. 1 and 7. However, in the embodiment of FIG. 12, ring gear assembly 310 includes a hanging bracket positioned generally opposite the open throat 350, thereby allowing ring gear assembly 310 to suspend by some type of overhead assembly (e.g., crane, overhead gantry system, etc.). In one example, hanging bracket 340 is a lifting eye having an ear section with an aperture formed through the ear sections. However, hanging bracket 340 could be any conventional or future developed structure allowing ring gear assembly to be suspended from a structure above the ring gear assembly.

One alternate embodiment includes a method of welding a pipe joint comprising the steps of: (a) positioning at least two sections of pipe extending through a weld system ring gear assembly mounted on a base carriage, the sections of pipe being mounted independently of the base carriage; (b) positioning the base carriage to detect a pipe joint along a line of the pipe sections; (c) setting a velocity of the base carriage to approximately the velocity of the pipe joint's lateral movement in order to maintain the position of the weld-head approximately at the pipe joint; (d) scanning the pipe joint with a position sensor mounted on the ring gear assembly; (e) welding of the pipe joint with a welding torch mounted on the ring gear assembly; and (f) re-scanning a weld for defects with the position sensor as the weld head assembly returns to a start position.

Another embodiment is a welding system comprising: (a) a traveling base carriage; (b) carriage positioning mechanism engaging the base carriage; (c) a ring gear assembly mounted on the base carriage; and (d) a weld head assembly mounted on the ring gear assembly. The weld head assembly includes (i) a welding torch; (ii) a torch positioner; and (iii) a position sensor. A line of pipe sections extend through the ring gear and are positioned independent of the traveling carriage. A joint sensor is spaced apart from the weld-heads and a system controller is programmed to control the carriage and the weld-head to perform the steps of: (i) detecting a pipe joint along a line of pipe sections; (ii) setting a velocity of the base carriage to approximate the pipe joint's lateral movement in order to maintain the position of the weld head assembly approximately at the pipe joint; (iii) simultaneously scanning of the pipe joint with the position sensor and welding of the pipe joint with the welding torch; and (iv) adjusting a path of the welding torch to accommodate a geometry of the pipe joint as detected by the position sensor. This embodiment could further perform the step of re-scanning a completed weld for defects with the position sensor as the weld-head returns to a start position.

In the above embodiment, the weld head assembly may comprise a first torch positioner moving the welding torch in a radial direction and a second torch positioner moving the welding torch in a lateral direction. Additionally, a third positioner may engage a gear on the ring gear assembly and move the weld head assembly in an angular direction. The positioning sensor may comprise a camera having a filter for filtering light wavelengths produced by welding with the welding torch. In a modification of this embodiment, the base carriage moves independently of the pipe sections.

A still further embodiment is a welding system comprising a ring gear assembly having an open throat and at least one weld-head assembly mounted on the ring gear assembly. The weld-head assembly including a mounting plate comprising: i) a welding torch, ii) a torch positioner, and iii) a position sensor. The mounting plate has sufficient length to position the welding torch across at least about one half of the open throat. A system controller is programmed to control the weld-head assembly to adjust a path of the welding torch to accommodate a geometry of the pipe joint as detected by the position sensor. In this embodiment, the open throat comprises an arcuate gap of between about 60 and about 120 degrees. Alternatively, the ring gear assembly further comprises a saddle brace and at least one movable positioning arm opposing the saddle brace. In one embodiment, there are at least two movable positioning arms wherein the movable positioning arms comprise piston and cylinder assemblies. Additionally, the saddle brace may have an arcuate surface between about 20 and about 60 degrees for engaging a pipe section. This ring gear assembly may also have a hanging bracket positioned generally opposite the open throat.

Although the present invention has been described in terms of specific embodiments, those skilled in the art will see many obvious variations and modifications. For example, the illustrated embodiments show the welding system mounted on generally horizontal surfaces (e.g., the deck of a pipe laying barge). However, a variation of the traveling base carriage could also be mounted "sideways" on a vertical surface. All such variations and modifications are intended to come within the scope of the following claims.

We claim:

1. A welding system for welding a pipe joint between two pipe sections, the welding system comprising:
   a. a traveling base carriage;
   b. a carriage positioning mechanism engaging the traveling base carriage;
   c. a ring gear assembly mounted on the traveling base carriage, the ring gear assembly comprising:
      i. half ring sections, each including at least one gear track;
      ii. a ring gear mount attaching the half ring sections to the traveling base carriage, the ring gear mounts allowing the half ring sections to separate and guiding the half ring sections into mating engagement;
   d. at least one weld head assembly mounted on the ring gear assembly, the at least one weld head assembly including: i) a welding torch; ii) a torch positioner, and ii) a position sensor;
   e. a system controller programmed to control at least the carriage positioning mechanism and the at least one weld head assembly to perform the following steps:
      i. setting a velocity of the traveling base carriage to approximate a pipe joint's lateral movement in a direction along a length of the pipe sections, in order to maintain a position of the at least one weld head assembly approximately at the pipe joint;
      ii. adjusting a path of the welding torch to accommodate a geometry of the pipe joint as detected by the position sensor; and
      iii. allowing the traveling base carriage to maintain the velocity approximate the pipe joint's lateral movement while adjusting the path of the welding torch to weld the pipe joint.

2. The welding system according to claim 1, wherein the ring gear mounts comprise tracks positioned on the traveling base carriage and guide rails positioned on the half ring sections.

3. The welding system according to claim 1, wherein the half ring sections have mating surfaces and guide members in order to align the gear tracks on the half ring sections.

4. The welding system according to claim 1, wherein the system controller is further programmed to:
   i. detect a pipe joint along a line of pipe sections; and
   ii. simultaneously scan of the pipe joint with the position sensor and weld the pipe joint with the welding torch.

5. The welding system according to claim 1, the controller further performing the step of moving the traveling base carriage along a pipe section until a pipe joint is detected and then tracking the pipe joint with the at least one weld head assembly positioned approximately at the pipe joint.

6. The welding system according to claim 1, wherein the at least one weld head assembly comprises a first torch positioner moving the welding torch in a radial direction and a second torch positioner moving the welding torch in a lateral direction.

7. The welding system according to claim 1, wherein (i) the pipe joint is formed by the junction of two pipe sections; and (ii) when the ring gear assembly is in a closed position, the ring gear assembly is not connected to and is capable of moving independently of the pipe sections.

8. The welding system according to claim 2, wherein the half ring sections each include upper and lower extension arms to which the guide rails are attached.

9. The welding system according to claim 2, wherein the ring gear mounts comprising a first track positioned between the traveling base carriage and a mounting plate, and a second track positioned on the mounting plate and being substantially perpendicular to the first track.

10. The welding system according to claim 3, wherein the guide members are formed on the mating surfaces.

11. The welding system according to claim 5, wherein the traveling base carriage moves independently of the pipe sections.

12. The welding system according to claim 5, further comprising a joint sensor spaced apart from the at least one weld head assembly which detects the pipe joint.

13. The welding system according to claim 6, wherein a third positioner engages a gear on the ring gear assembly and moves the at least one weld head assembly in an angular direction.

14. The welding system according to claim 9, wherein the second track is positioned horizontally such that extension arms of the half ring sections may travel along the second track.

15. The welding system according to claim 10, wherein the guide member on a mating surface of one half ring assembly is an extending pin and the guide member on a mating surface of the other half ring assembly is an aperture sized to receive the extending pin.

16. A welding system comprising:
   a. a traveling base carriage;
   b. a carriage positioning mechanism engaging the traveling base carriage;
   c. a ring gear assembly mounted on the traveling base carriage such that a pipe section extending through a center opening in said ring gear assembly is not connected to and is capable of moving in a lateral direction independently of the ring gear assembly;
   d. at least one weld head assembly mounted on the ring gear assembly and capable of moving relative to the ring gear assembly, the at least one weld head assembly including: i) a welding torch; ii) a torch positioner, and iii) a position sensor;

e. a system controller programmed to control at least the carriage positioning mechanism and the at least one weld head assembly to perform the following steps:
  i. detecting a pipe joint along a line of pipe sections;
  ii. setting a velocity of the traveling base carriage to approximate the pipe joint's lateral movement in order to maintain the position of the at least one weld head assembly approximately at the pipe joint;
  iii. simultaneously scanning of the pipe joint with the position sensor and welding of the pipe joint with the welding torch; and
  iv. adjusting a path of the welding torch to accommodate a geometry of the pipe joint as detected by the position sensor.

17. The welding system according to claim 16, further comprising a joint sensor spaced apart from the at least one weld head assembly which detects the pipe joint.

18. The welding system according to claim 16, further comprising re-scanning a weld for defects with the position sensor as the at least one weld head assembly returns to a start position.

19. The welding system according to claim 16, the controller further performing the step of moving the traveling base carriage along a pipe section until a pipe joint is detected and then tracking the pipe joint with the at least one weld head assembly positioned approximately at the pipe joint.

20. The welding system according to claim 16, wherein the at least one weld head assembly comprises a laser welding torch.

21. The welding system according to claim 16, wherein support rollers are positioned on either side of the traveling base carriage and a rotation sensor detects the lateral travel of a pipe section.

22. The welding system according to claim 16, wherein the controller detects the pipe joint base upon a signal from the position sensor.

23. The welding system according to claim 16, wherein the ring gear assembly is not connected to and is capable of moving independently of the pipe sections.

24. The welding system according to claim 17, wherein the traveling base carriage includes a floor plate and the joint sensor comprises a camera mounted on the floor plate.

25. The welding system according to claim 20, wherein the welding system has a single weld head assembly.

26. The welding system according to claim 25, wherein the single weld head assembly traverses a substantially full orbit around the ring gear assembly.

27. A welding system comprising:
  a. a traveling base carriage;
  b. a carriage positioning mechanism engaging the traveling base carriage;
  c. a ring gear assembly mounted on the traveling base carriage, wherein (i) a pipe section extends through a center opening in said ring gear assembly, and (ii) the ring gear assembly is not connected to and is capable of moving independently of the pipe section;
  d. at least one weld head assembly mounted on the ring gear assembly and capable of moving relative to the ring gear assembly, the at least one weld head assembly including: i) a welding torch; ii) a torch positioner, and iii) a position sensor;
  e. a system controller programmed to control at least the carriage positioning mechanism and the at least one weld head assembly to perform at least the following steps:
  i. moving the traveling base carriage along the length of the pipe section and detecting a pipe joint associated with the pipe section;
  ii. setting a velocity of the traveling base carriage to approximate a pipe joint's lateral movement in order to maintain a position of the at least one weld head assembly approximately at the pipe joint;
  iii. welding of the pipe joint with the welding torch.

28. The welding system according to claim 27, wherein the ring gear assembly comprises two half ring sections.

* * * * *